No. 895,480. PATENTED AUG. 11, 1908.
N. M. MATHIESEN.
SAFETY SUIT COMPRISING ARTICLES OF DRESS, GIRDLES, &c.
APPLICATION FILED JULY 29, 1905.
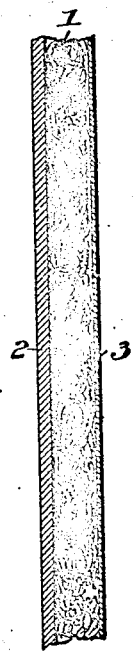
Witnesses:
C. H. Crawford
C. Schallinger
Inventor:
Niels Mathias Mathiesen
by B. Singer
Attorney

UNITED STATES PATENT OFFICE.

NIELS MATHIAS MATHIESEN, OF COPENHAGEN, DENMARK.

SAFETY-SUIT COMPRISING ARTICLES OF DRESS, GIRDLES, &c.

No. 895,480.

Specification of Letters Patent.

Patented Aug. 11, 1908.

Application filed July 29, 1905. Serial No. 271,850.

*To all whom it may concern:*

Be it known that I, NIELS MATHIAS MATHIESEN, a citizen of Denmark, and residing at Copenhagen, Denmark, have invented certain new and useful Improvements in Safety-Suits Comprising Articles of Dress, Girdles, &c.; and I do hereby declare the following to be a full, clear, and exact description of the invention, such as will enable others skilled in the art to which it appertains to make and use the same.

The present invention consists in the provision of means for rendering safety suits, girdles, and similar life-preserving appliances buoyant by the provision of a filling, lining or the like, consisting of a vegetable substance subjected to a treatment designed to make same incapable of absorbing water.

As shown in the accompanying drawing the invention is applied as a filling 1 and is interposed between an outer casing 2 and an inner lining 3. The material may be stitched or otherwise firmly secured in place in any desirable manner. The filling 1 may consist of any soft, resilient vegetable material, preferably cotton, and prior to its insertion or attachment to the garment it is thoroughly saturated with a water-repelling substance, such as oil.

It will be understood that a safety suit or girdle made in accordance with my invention will not be capable of resisting moisture or liquid penetration for a very great length of time in other words it will not be permanently water repelling but will be buoyant for an ordinarily sufficient length of time to float a wreck victim until he is rescued.

I claim:

A life preserver provided with a filling consisting of cotton saturated throughout its interstices with a vapor impregnated with an oily substance.

In testimony whereof, I have signed my name to this specification in the presence of two subscribing witnesses.

NIELS MATHIAS MATHIESEN.

Witnesses:
HANS PEDERSEN,
ARTHUR MÖLLER.